UNITED STATES PATENT OFFICE.

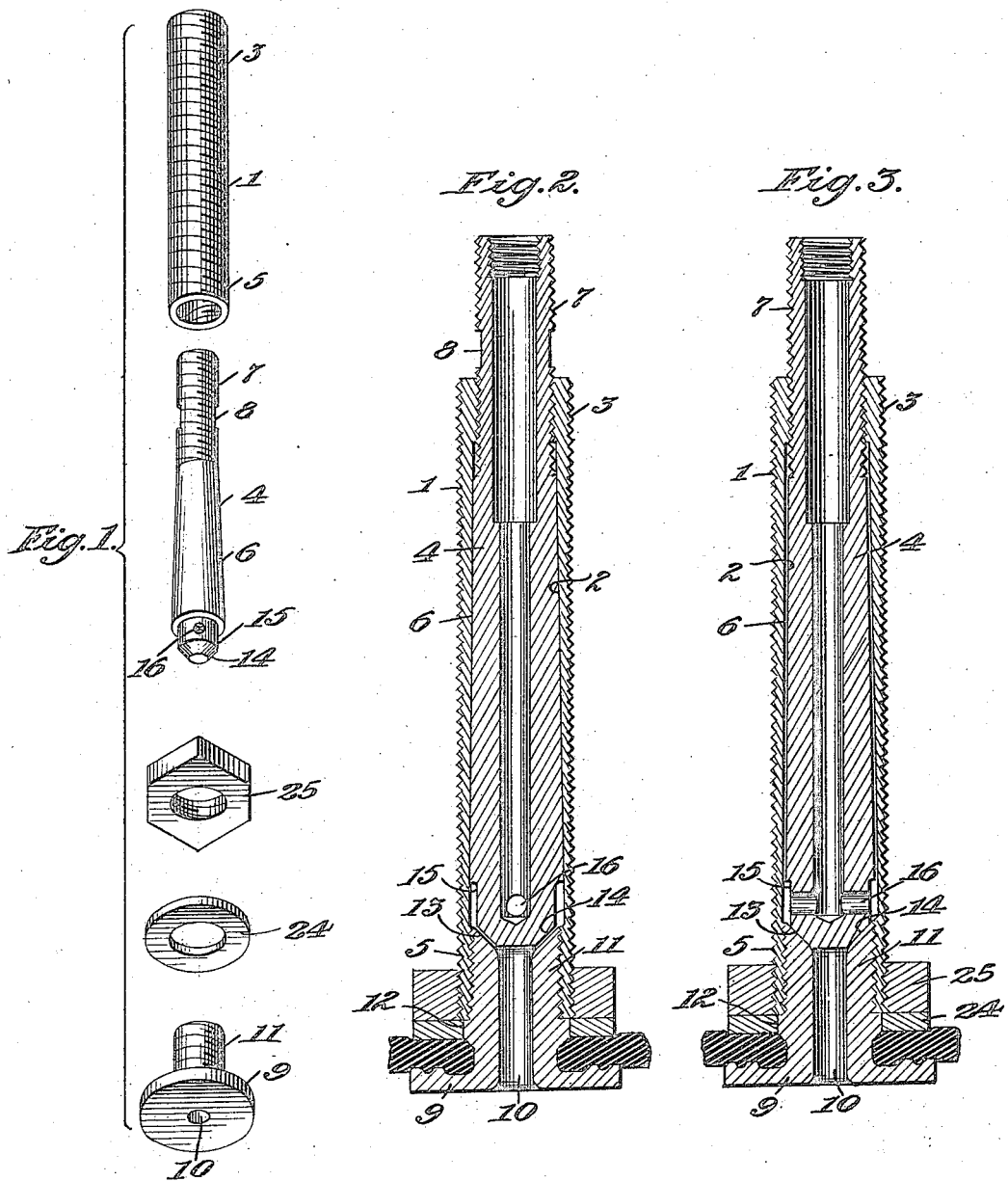

CHARLES J. REYNOLDS, OF MELROSE, MASSACHUSETTS.

INFLATION VALVE.

1,419,471. Specification of Letters Patent. Patented June 13, 1922.

Application filed June 4, 1920. Serial No. 386,569.

*To all whom it may concern:*

Be it known that I, CHARLES J. REYNOLDS, a citizen of the United States, residing at Melrose, in the county of Middlesex and State of Massachusetts, have invented certain new and useful Improvements in Inflation Valves, of which the following is a specification.

The present invention relates to inflation valves for pneumatic tires. The great difficulty in all known valves of this general type is liability to leaks. An almost imperceptible leak permits the tire to become slightly deflated and this, in turn, permits sand and other foreign matter to work in at the edges of the outer casing or shoe and get between it and the inner tube, thus causing, by far the greater part of the "punctures." "Rim cuts" are also due almost entirely to this slow partial deflation from leaks. The leaks, of course, are due to faulty closure or operation of the valves, which, in turn, is most usually due to either complexity of construction or some weakness in one or more of the several parts making up the inflation valve.

The main objects of the invention are to overcome the defects above noted and provide a strong, durable, leak-proof inflation valve of very few parts and simplest possible construction and, consequently, of very inexpensive manufacture. Another important object is to provide a double air-lock, which will, in one position, positively prevent escape of air during inflation and, in another position, positively prevent escape of air from the tube after inflation has been completed.

In the drawings:

Fig. 1 is a perspective view of the parts, separated and superposed;

Fig. 2 is a central longitudinal cross section, with the valve ready for inflation; and Fig. 3 is a similar view after inflation is finished.

In the present invention, leakage is prevented by having the valve of the fewest possible parts and the simplest possible construction, and providing a snug metal-to-metal closure between the valve faces and the cooperating valve seats.

In making the invention, three principal parts are involved; the barrel, base and spindle.

In order to provide an adequate air-lock during inflation, a wedge construction is resorted to, comprising a very gradual inward taper of the inner wall of the barrel and a corresponding taper of the cooperating wall of the spindle. While the airlock against leakage after inflation, is made by cooperating tapered faces on the spindle end and base post, all as will more clearly appear from the succeeding detailed description.

The barrel is a tubular member 1 of substantially uniform exterior diameter and having its outer wall screw threaded from end to end and its inner wall very gradually tapered inwardly from one end toward the other to provide a valve seat 2, the taper being, preferably, about .006 of an inch to the inch, more or less. The ends of the barrel are interiorly screw-threaded as at 3 and 5. The spindle 4 is a tubular rod having a very gradual taper from one end toward the other, the taper corresponding with that of the barrel and forming a valve face 6 adapted to be seated on and cooperate with the valve seat 2. The upper or smaller end of the spindle is exteriorly screw threaded as at 7 and provided with flats 8 for engagement of a wrench, spanner, or similar tightening tool. In assembling, the spindle is inserted through the large end of the barrel and its threads 7 turned into the threads 3 of the barrel. As it is turned up, the threaded end passes through and beyond the end of barrel 1 and the valve face 6 approaches the barrel wall or valve seat 2. Gradually the two tapered walls engage. Then a wrench or other tool may be applied to the spindle by engagement with flats 8, and the spindle forced tightly home so that there is a tight leak-proof engagement between the valve face 6 and valve seat 2 making an absolute prevention of escape of air to and through the thread connection between the barrel and spindle. Into the threads 5 of the opposite end of the barrel is turned the externally threaded post 11 of the base 9 which is provided with the longitudinal air passage 10 through which air may pass from the interior of barrel 1 to the inner tube of the tire. Preferably, also, the base is provided with an annular shoulder 12 adapted to engage the end of the barrel 1 and act as a stop. The inner end of the post 11 is beveled radially inwardly and toward the head of the base to provide a conical valve seat 13 substantially concentric with the passage 10. The inner free end of spindle 4 is correspondingly beveled to provide a cooperating valve face 14 which is adapted to seat in and make a tight closure on the valve seat 13, making a secure air-lock against escape of air from the tire after inflation has been completed, as in Figure 3. To provide an air chamber for ready flow of air from spindle 4, between valve face 13 and valve seat 14, and thence through the passage 10 to the interior of the tire, the free end of the spindle is slightly reduced in diameter as at 15, providing an air chamber wall extending longitudinally from the valve face 14 toward the opposite end of the spindle and cooperating with the adjacent portion of the inner wall of barrel 1 to form an annular air chamber. Through this reduced portion 15 extends an air passage 16 which establishes communication between the annular air chamber and the interior of the tubular spindle.

A washer 24 and clamping nut 25 are used to clamp the head of the base to the tire, as will be readily understood.

In assembling the device, the spindle 4 is passed longitudinally into the barrel 1 through the large end, small end first.
After engagement of the threads of the barrel by those of the spindle, the spindle is turned up until tight engagement between valve seat 2 and valve face 6, then the base post 11 is turned into the end of the barrel 1 until shoulder 12 engages the barrel end, and the head of the base is then suitably seated in the tire which is then clamped thereto by the nut and washer in well known manner. Then the device is ready for inflation, with valve face 14 raised from the seat 13 to permit passage of air through the spindle, air chamber, and base-post and into the tire. The tight engagement of valve 6 with seat 2 prevents passage of air from the air chamber to the screw thread connection between the spindle and barrel whence it might easily leak out. Then a wrench or other tool is applied to the flats 8 and the spindle is turned about one-half rotation, down or in, tightly seating valve 14 on valve seat 13, making a tight-air lock at that point so that air in the tire can not leak out. It should be noted that in making the closure to prevent escape of air from the tire, the spindle travels in a direction radially from the hub toward the tire of the wheel, the valve, as a whole, being applied in the usual manner. The result of this disposition of the parts is an automatic tightening of the valve during use, due to jar and centrifugal force. As the vehicle travels, there is continual tremulous jar, tending to shake loose the threaded engagement between the spindle and barrel, and, at the same time, there is the ever present pull of centrifugal force so that the spindle is continually drawn down to a tight seat as the wheel rotates, as will be clearly understood. This explains the fact that, after considerable use, these valves are always much tighter than when first applied.

Having thus described my invention, what I claim and desire to protect by Letters Patent is:
1. An inflation valve comprising, a barrel having an interior diameter decreasing from one end to the other end, a tubular spindle adapted to be mounted within said barrel and provided with a tapered valve face adapted to engage and cooperate with the inner wall of said barrel and having an air passage communicating with the interior of said barrel, a valve face carried by one end of said spindle, and a base provided with a post threaded for connection to said barrel, said post having an air passage and being provided with a valve seat surrounding the same and adapted to cooperate with the valve face carried by the spindle end.
2. An inflation valve comprising, a barrel provided with an interior valve seat, a tubular spindle adapted to be mounted therein and provided with a valve face adapted to cooperate with said valve seat to prevent escape of air during inflation when said spindle is moved in one direction relatively to said barrel, a base having a tubular post adapted to be threaded into said barrel and carrying a valve seat, and a valve carried by said spindle and adapted to cooperate with said seat when the spindle is moved in the opposite direction, to prevent escape of air after inflation, the inner end of said spindle being reduced to provide an air chamber and being provided with an air passage establishing communication between the interior of the spindle and the interior of the barrel.

3. An inflation valve comprising, a barrel having an interior diameter gradually decreasing from one end to the other approximately throughout its entire length to provide a valve seat of extended area and very gradual taper, a tubular spindle of substantially the same length as the barrel and adapted to be adjustably mounted within said barrel and provided with an exterior tapered valve face extending the greater part of its length and adapted to engage and cooperate with said valve seat to prevent escape of air during inflation, said spindle being provided with an air passage communicating with the interior of said barrel; a base provided with a tubular post adapted to be threaded into said barrel and having a valve seat, and a valve face carried by the aforesaid spindle and adapted to cooperate with said valve seat to prevent escape of air after inflation.

4. An inflation valve comprising, a barrel provided with an interior valve seat, a tubular spindle adapted to be mounted therein and provided with a valve cooperating with said valve seat to prevent escape of air during inflation when said valve is moved in one direction relatively to said barrel, a base provided with a tubular post adapted to be threaded into said barrel and carrying a valve seat, and a valve carried by the inner end of said spindle at a distance from the aforesaid valve face thereon and adapted to cooperate with the said valve seat when the spindle is moved in the opposite direction, to prevent escape of air after inflation, that portion of the spindle between the aforesaid valve face and said valve being reduced to provide an air chamber and having a passage communicating with the interior of said spindle.

5. An inflation valve comprising, a barrel having an interior diameter gradually decreasing from one end to the other to provide a valve seat of extended area and very gradual taper, a tubular spindle adapted to be adjustably mounted within said barrel and provided with an exterior tapered valve face adapted to engage and cooperate with said valve seat when said spindle is moved in one direction relatively to said barrel, to prevent escape of air during inflation, a base provided with a tubular post adapted to be threaded into said barrel and provided with a beveled valve seat, and a beveled valve face carried by the inner end of said spindle at a distance from the aforesaid valve face thereon and adapted to cooperate with said valve seat when the spindle is moved in the opposite direction, to prevent escape of air after inflation, that portion of the spindle between the aforesaid valve face and said valve being reduced to provide an air chamber and having a passage communicating with the interior of said spindle.

In testimony whereof, I have signed my name to this specification in the presence of two subscribing witnesses.

CHARLES J. REYNOLDS.

Witnesses:
 DANIEL W. DONAHUE,
 EMMA J. PUFFER.